United States Patent
Videt et al.

(10) Patent No.: US 8,964,425 B2
(45) Date of Patent: Feb. 24, 2015

(54) POWER CONVERTER WITH CONTROLLED CURRENT SOURCE TO REDUCE HARMONIC DISTORTION

(75) Inventors: Arnaud Videt, Villeneuve d'Ascq (FR); Thomas Devos, Carrieres sous Poissy (FR); Heu Vang, Carrieres sous Poissy (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 605 days.

(21) Appl. No.: 13/276,542

(22) Filed: Oct. 19, 2011

(65) Prior Publication Data

US 2012/0113691 A1    May 10, 2012

(30) Foreign Application Priority Data

Nov. 5, 2010 (FR) ..................... 10 59116

(51) Int. Cl.
*H02M 1/12* (2006.01)
*H02M 7/217* (2006.01)

(52) U.S. Cl.
CPC .............. *H02M 7/2176* (2013.01); *H02M 1/12* (2013.01)
USPC .............................................. 363/39; 363/34

(58) Field of Classification Search
CPC ..... H02M 3/3376; H02M 3/337; H02M 5/42; H02M 7/04; H02M 1/12; H02M 7/42; H02M 7/2176; Y02B 70/126
USPC ................ 363/34, 39, 44, 45, 81, 84, 89, 127
See application file for complete search history.

(56) References Cited

U.S. PATENT DOCUMENTS

| 5,483,140 | A * | 1/1996 | Hess et al. ..................... 318/802 |
| 5,499,178 | A * | 3/1996 | Mohan ............................. 363/39 |
| 2002/0089864 | A1 * | 7/2002 | Kalman et al. .................. 363/34 |
| 2005/0146226 | A1 * | 7/2005 | Trainer et al. ................... 307/73 |
| 2007/0114962 | A1 * | 5/2007 | Grbovic ......................... 318/772 |
| 2009/0059625 | A1 * | 3/2009 | Viitanen et al. ................. 363/36 |

(Continued)

FOREIGN PATENT DOCUMENTS

WO    WO 2009/147186 A1    12/2009

OTHER PUBLICATIONS

U.S. Appl. No. 13/996,299, filed Jun. 20, 2013, Videt, et al.

(Continued)

*Primary Examiner* — Jeffrey Sterrett
*Assistant Examiner* — Gustavo Rosario Benitez
(74) *Attorney, Agent, or Firm* — Oblon, Spivak, McClelland, Maier & Neustadt, L.L.P.

(57) ABSTRACT

A power converter including a rectifier stage connected to plural phases of a network delivering an input current at a determined fundamental frequency, a DC power supply bus and a bus capacitor connected to the DC power supply bus. The converter includes a controlled current source situated on the DC power supply bus, the current source making it possible to control a rectifier current, flowing on the DC power supply bus, and a controller for the controlled current source to control a rectifier current, flowing on the DC power supply bus. The controller is configured to implement a regulation loop into which are injected a first harmonic and a second harmonic synchronized respectively at six times and twelve times the fundamental frequency of the input current delivered by the network, the amplitude and phase of these harmonics being determined to limit the THDi and the PWHD.

6 Claims, 5 Drawing Sheets

(56) References Cited

U.S. PATENT DOCUMENTS

2009/0206950 A1* 8/2009 Venkatesh .................. 333/178
2011/0057587 A1  3/2011 Baudesson et al.

OTHER PUBLICATIONS

U.S. Appl. No. 13/277,639, filed Oct. 20, 2011, Videt, et al.
French Preliminary Search Report and Written Opinion issued Jul. 19, 2011, in French 1059116, filed Nov. 5, 2010 (with English Translation of Categories of Cited Documents).
Hans Ertl, et al., "A Constant Output Current Three-Phase Diode Bridge Rectifier Employing a Novel Electronic Smoothing Inductor", IEEE Transactions on Industrial Electronics, vol. 52, No. 2, XP011129546, Apr. 2005, pp. 454-461.
J. Salmon, et al., "Improving the Operation of 3-phase Diode Rectifiers using an Asymmetrical Half-Bridge DC-Link Active Filter", Conference Record of the 2000 IEEE Industrial Applications Conference, vol. Conf. 35, XP001042610, Oct. 2000, pp. 2115-2122.
Yungtaek Jang, et al., "A novel, robust, harmonic injection method for single-switch, three-phase, discontinuous-conduction-mode boost rectifiers", Power Electronics Specialists Conference, vol. 1, XP010241587, Jun. 1997, pp. 469-475.

* cited by examiner

POWER CONVERTER WITH CONTROLLED CURRENT SOURCE TO REDUCE HARMONIC DISTORTION

FIELD

The present invention pertains to a variable speed drive fitted with a controlled current source.

BACKGROUND

In a known manner, a power converter comprises several input phases connected to the network, for example three input phases if it is connected to a three-phase network. Connected to its input phases, a power converter comprises a rectifier stage making it possible to transform the AC voltage provided by the network into a DC voltage. The converter also comprises a power supply bus fitted with a first power supply line with positive potential and with a second power supply line with negative potential and to which lines the DC voltage is applied and a bus capacitor connected between the first power supply line and the second power supply line and intended to maintain the DC voltage on the bus constant.

When the rectifier stage is connected between an AC network and a capacitive load, such as for example the DC power supply bus of a variable speed drive, the input current drawn from the network is formed of spikes corresponding to the recharging of the bus capacitor as soon as the voltage between input phases (AC) becomes greater than the voltage of the power supply bus ($V_{bus}$). Whether the rectifier stage is single-phase or three-phase, the input current drawn from the network is therefore far from being sinusoidal since, in addition to its fundamental, it contains numerous harmonics. The input current $I_e$ drawn from the network is therefore defined by a fundamental current to which are added harmonics whose amplitude can be expressed as a percentage with respect to the fundamental current.

The harmonics of the input current $I_e$ are characterized by two known indicators dubbed THDi ("Total Harmonic Distortion of Current") and PWHD ("Partial Weighted Harmonic Distortion"). The THDi corresponds to the harmonic current distortion ratio which represents the rms value of the harmonics relative to the rms value of the fundamental current. For its part, the PWHD introduces a weighting giving extra weight to the high-frequency harmonics, more particularly those of orders 14 to 40.

A power converter connected to a three-phase network must satisfy the IEC61000-3-12 standard imposing a limit value for the indicator THDi, a limit value for the indicator PWHD as well as limit values for the harmonics of order 5, order 7, order 11 and order 13 of the input current.

According to this standard, for an RSCE of greater than 350:
the THDi must be less than 48% of the fundamental current,
the PWHD must be less than 46% of the fundamental current,
the harmonic of order 5 must be limited to 40% of the fundamental current,
the harmonic of order 7 must be limited to 25% of the fundamental current,
the harmonic of order 11 must be limited to 15% of the fundamental current,
the harmonic of order 13 must be limited to 10% of the fundamental current.

In a known manner, the RSCE characterizes the nominal apparent power of the converter with respect to the short-circuit power of the network to which the converter is connected.

A known solution for reducing the THDi is to perform a filtering on the DC bus through the addition of a DC inductor, which, if its value is sufficiently large, ensures continuous conduction, that is to say the rectifier current $I_{red}$ flowing on the bus, as output from the rectifier, never drops back to zero. The larger the value of the inductor employed, the less the ripple in the rectifier current $I_{red}$. If the value of the DC inductor tends to infinity, the rectifier current becomes constant and there is no longer any ripple in the DC bus voltage since it is stabilized at the mean value of the rectifier voltage $V_{red}$. To obtain a rectifier current $I_{red}$ which is as constant as possible, the value of the inductor will therefore have to be very high, and this will give rise to cost and bulkiness problems.

SUMMARY

The aim of the invention is to propose a power converter in which the input current is at least compliant with the IEC61000-3-12 standard whose criteria are defined hereinabove, and whose profile can approach as closely as possible that obtained with an inductor of infinite value.

This aim is achieved by a power converter comprising:
a rectifier stage connected to several phases of a network delivering an input current at a determined fundamental frequency and to which a rectifier voltage is applied,
a DC power supply bus connected to the rectifier stage and comprising a first power supply line and a second power supply line to each of which an electric potential is applied with a view to obtaining a voltage on the DC power supply bus,
a bus capacitor connected to the first power supply line and to the second power supply line,
characterized in that it comprises:
a controlled current source situated on the first power supply line or the second power supply line, upstream of the bus capacitor, the said controlled current source comprising an inductor and a variable voltage source,
control means for the controlled current source, which are configured to apply a determined voltage across the terminals of the variable voltage source with a view to controlling a current, termed the rectifier current, flowing on the DC power supply bus, the said voltage being determined on the basis of the rectifier voltage, of the voltage on the DC power supply bus and of current harmonics comprising a first harmonic and a second harmonic synchronized respectively at six times and twelve times the fundamental frequency of the input current delivered by the network, the amplitude and the phase of these harmonics being determined so as to limit the THDi and the PWHD.

According to one feature, the control means are configured to implement a regulation loop designed to cause the rectifier current to follow a reference value equal to a mean reference value onto which the said harmonics are injected.

According to another feature, the control means are configured to implement a regulation loop designed to cause the voltage on the DC power supply bus to follow a reference value containing the said harmonics.

According to another feature, the regulation loop is intended to determine a reference value for the voltage across the terminals of the variable voltage source.

According to another feature, the first harmonic exhibits an amplitude lying between 10% and 30% of the rectifier current.

According to another feature, the second harmonic exhibits an amplitude lying between 0 and 15% of the rectifier current.

According to another feature, the first harmonic and the second harmonic are initially injected in phase opposition.

According to another feature, the variable voltage source comprises an electronic converter comprising a first switching arm, a second switching arm and a capacitor which are connected in parallel, each switching arm comprising at least one electronic switch.

The invention also relates to a variable speed drive comprising an inverter stage furnished with switching arms which are intended to convert a DC voltage into a variable voltage intended to power an electrical load, this variable drive comprising a power converter such as defined hereinabove and connected upstream of its inverter stage.

BRIEF DESCRIPTION OF THE DRAWINGS

Other characteristics and advantages will become apparent in the detailed description which follows while referring to an embodiment given by way of example and represented by the appended drawings in which.

DETAILED DESCRIPTION

Figure 1:
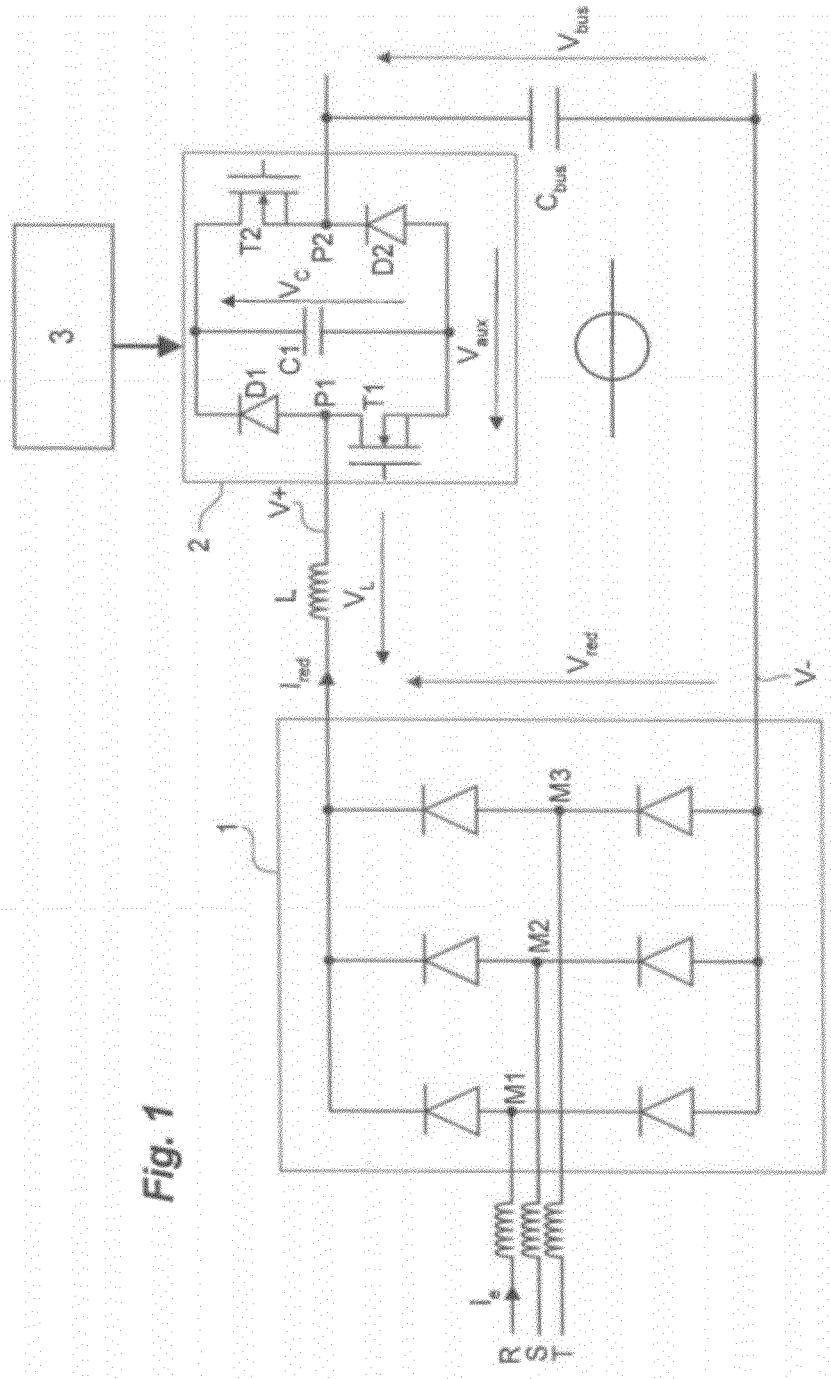
FIG. 1 represents the power converter of the invention.

With reference to FIG. 1, in a known manner, a power converter comprises a rectifier stage 1 and a DC power supply bus. Various power converter configurations are possible. The rectifier stage 1 employed may be of a conventional nature with a diode bridge or be active by being fitted with controlled switching arms.

In the subsequent description and as represented in FIG. 1, particular attention will be paid to a power converter fitted with a diode bridge passive rectifier stage.

With reference to FIG. 1, the rectifier stage 1 is connected to the network, for example via AC inductors on three input phases R, S, T. In this figure, the rectifier stage 1 is passive and composed of a diode bridge which makes it possible to rectify the AC voltage provided by the network and to apply a DC voltage on the DC power supply bus. More precisely, the rectifier stage 1 comprises several arms each composed of two diodes in series, each arm being connected to an input phase R, S, T by the midpoint M1, M2, M3 situated between the two diodes.

The DC power supply bus is connected downstream of the rectifier stage 1. It comprises a power supply line with positive potential V+ and a power supply line with negative potential V−. At least one bus capacitor Cbus is connected to each of the two power supply lines of the bus and makes it possible to maintain the voltage of the bus at a constant value.

The objective of the invention is to propose a power converter in which the input current $I_e$ exhibits a profile allowing it to conform to the IEC61000-3-12 standard and therefore to satisfy the criteria defined in this standard. The invention applies most particularly to a power converter of variable speed drive type comprising downstream of the power supply bus an inverter stage comprising several controlled switching arms so as to chop the DC voltage with a view to powering an electrical load with a variable voltage.

Accordingly, the power converter employs a controlled current source connected in series on the first or the second power supply line of the converter, upstream of the bus capacitor and intended to control the current output by the rectifier stage and flowing on the DC power supply bus, hereinafter designated rectifier current, with a view to influencing the parameters defined in the aforementioned standard.

This controlled current source takes for example the form of a controlled electronic inductor comprising:

an inductor L of low value, a controlled variable voltage source taking the form of an electronic converter 2 composed of two distinct switching arms in parallel and of a capacitor C1 connected in parallel with the two switching arms.

If the rectifier stage 1 of the power converter is non-reversible, like for example a diode bridge, the switching arms of the electronic converter may be unidirectional in current. On the other hand, if the rectifier stage is reversible, that is to say composed of controlled switching arms, the switching arms of the electronic converter must be bidirectional in current so as to permit energy regeneration on the network.

Various topologies may be employed for the electronic converter 2, depending on the type of rectifier stage 1 employed, but also according to the size of the inductor L which is connected to it.

For a non-reversible rectifier stage 1, the two switching arms of the electronic converter 2 each comprise for example an electronic switch T1, T2 connected in series with a diode D1, D2. Each switching arm comprises a connection midpoint P1, P2 situated between its electronic switch T1, T2 and its diode D1, D2. The connection midpoint P1 of the first switching arm is connected to the DC inductor and the connection midpoint P2 of the second switching arm is connected to the bus capacitor $C_{bus}$. On one switching arm of the electronic converter 2, the series arrangement of the electronic switch and of the diode is inverted with respect to that of the other switching arm.

If the power converter employs a reversible rectifier stage, each switching arm of the electronic converter 2 comprises for example two electronic switches (configuration not represented).

The electronic switches T1, T2 employed in the electronic converter 2 are for example transistors of MOSFET type controlled by suitable control means 3, employing for example PWM (Pulse Width Modulation) control. Other components able to fulfil the same function can of course be employed.

The electronic converter 2 thus behaves as a controlled variable voltage source making it possible to obtain the voltage $V_{aux}$. The following relation is thus obtained between the voltage of the bus $V_{bus}$, the voltage $V_L$ across the terminals of the inductor L, the voltage $V_{aux}$ across the terminals of the controlled electronic converter 2 and the voltage $V_{red}$ of the rectifier 1:

$$V_L = V_{red} - V_{bus} - V_{aux}$$

By controlling the voltage $V_{aux}$ across the terminals of the electronic converter 2, it is thus possible to make $V_L$ vary and thus to control the rectifier current $I_{red}$ and to impose a particular profile on it. By controlling the rectifier current $I_{red}$, it is thus possible to control the THDi, the PWHD and to limit the influence of the harmonics of orders 5, 7, 11 and 13 on the input current $I_e$ as required by the standard designated hereinabove.

The voltage $V_{aux}$ across the terminals of the electronic converter 2 may be controlled in various ways by virtue of the control means 3 for the electronic switches T1 and T2 of the electronic converter, for example by implementing a regulation loop. Various regulation loops are possible:

A first regulation loop consists for example in determining a reference trajectory $I_{red}^{ref}$ making it possible to fulfil the objectives for the rectifier current $I_{red}$ and then to regulate this trajectory.

Another possible regulation loop consists for example in regulating the voltage $V_{bus}$ around a trajectory $V_{bus}^{ref}$ containing the necessary harmonics so that the input current fulfils the objectives defined in the standard. This solution will make it possible especially to avoid employing a current sensor to measure the rectifier current $I_{red}$.

Figure 2:
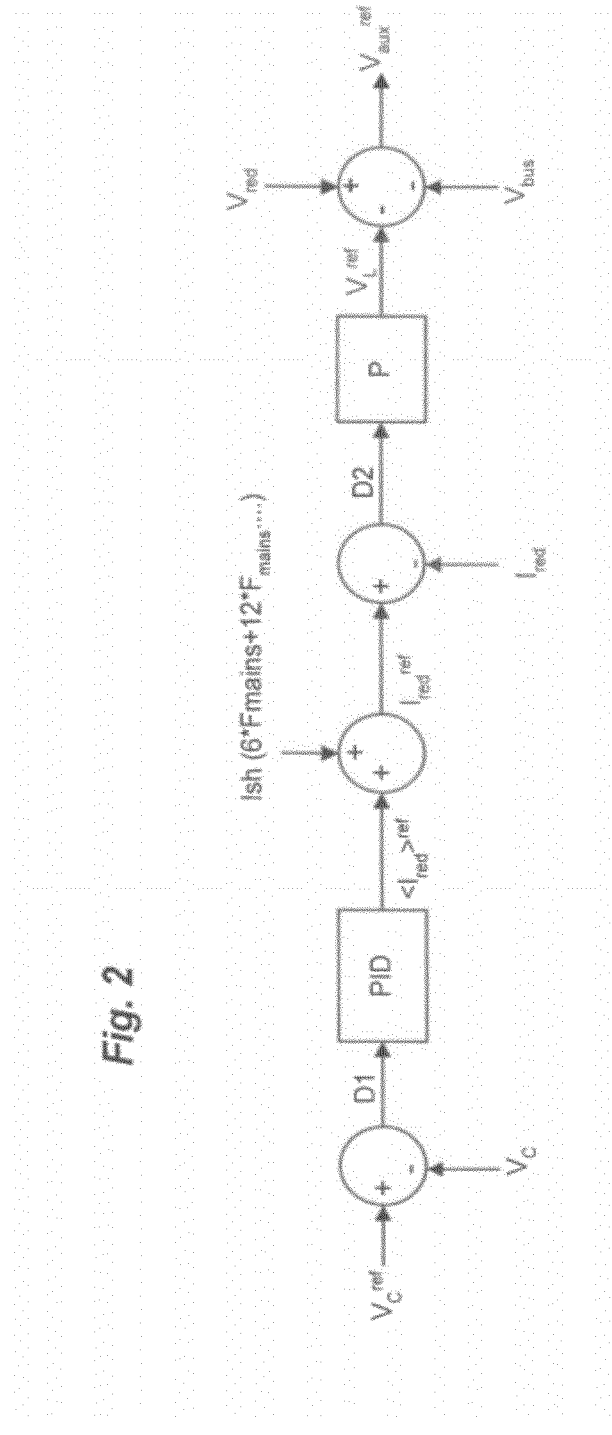
FIG. 2 represents the regulation loop implemented by control means for the power converter.

An example of a current-regulation loop implemented by the control means may be seen in FIG. 2 and follows the process described hereinbelow. Other examples of regulation loops making it possible to obtain the same results can of course be contemplated. This regulation loop is divided into a voltage regulation loop making it possible to determine a reference value $I_{red}^{ref}$ for the rectifier current and a current regulation loop intended to determine a reference value $V_{aux}^{ref}$ for the voltage across the terminals of the electronic converter 2 on the basis of the reference value $I_{red}^{ref}$ for the rectifier current. The global regulation loop follows the following process:
- application as input of a reference value $V_C^{ref}$ for the voltage across the terminals of the capacitor C1 of the electronic converter 2,
- measurement of the value of the voltage $V_C$ across the terminals of the capacitor C1 of the electronic converter 2,
- comparison between the reference value $V_C^{ref}$ applied as input and the measured value $V_C$ for the voltage across the terminals of the capacitor C1 of the electronic converter 2 so as to determine a difference D1,
- introduction of the said difference D1 into a regulator such as for example a Proportional-Integral-Derivative (PID) regulator so as to determine a reference value $<I_{red}>^{ref}$ of a mean rectifier current,
- injection of harmonics $I_{sh}$ onto the reference value $<I_{red}>^{ref}$ of the mean rectifier current, the said harmonics $I_{sh}$ being synchronized with 6*k times the fundamental frequency $F_{mains}$ of the input current $I_e$ delivered by the network as input to the converter, k being an integer greater than or equal to 1 incremented by one unit for each additional harmonic, so as to generate a reference value $I_{red}^{ref}$ for the rectifier current,
- comparison between the reference value $I_{red}^{ref}$ obtained for the rectifier current and the rectifier current $I_{red}$ measured and determination of a difference D2,
- introduction of the said difference D2 into a regulator, such as for example a Proportional (P) regulator so as to determine a reference value $V_L^{ref}$ for the voltage across the terminals of the inductor L of the controlled current source,
- determination of a reference value $V_{aux}^{ref}$ for the voltage across the terminals of the electronic converter 2 on the basis of the reference value $V_L^{ref}$ of the voltage across the terminals of the inductor L, of a measurement of the rectifier voltage $V_{red}$, and of a measurement of the voltage of the DC power supply bus $V_{bus}$.

According to the invention, the harmonics $I_{sh}$ injected to determine the reference value $V_{red}^{ref}$ of the rectifier current must be generated at a frequency, amplitude and phase that are determined with a view to limiting at one and the same time the THDi, the PWHD and the harmonics of order 5, of order 7, of order 11 and of order 13 of the input current $I_e$.

Accordingly, the harmonics are injected onto the reference value of the mean rectifier current at a frequency of 6*k times the frequency of the input current, k being an integer greater than or equal to 1, incremented by one unit for each additional harmonic injected. If the frequency of the network is 50 Hz, harmonics can therefore be injected at 300 Hz for a harmonic termed of order 1, 600 Hz for a harmonic termed of order 2, 900 Hz for a harmonic termed of order 3, 1200 Hz for a harmonic termed of order 4, 1500 Hz for a harmonic termed of order 5 and with an amplitude and a phase that are determined with a view to limiting at one and the same time the THDi, the PWHD and the harmonics of order 5, of order 7, of order 11 and of order 13 of the input current $I_e$. However, this does not simply entail injecting several harmonics at 6*k times the frequency of the network since the results obtained are not always satisfactory.

According to the invention, it turns out that the injection of only two harmonics synchronized respectively at six times (k=1) the frequency of the network and at twelve times (k=2) the frequency $F_{mains}$ of the network, with determined amplitudes lying between 10% and 30% of the rectifier mean current $<Ired>$ for the harmonic HM1 of order 1 and lying between 0 and 15% of the rectifier mean current $<Ired>$ for the harmonic HM2 of order 2, makes it possible to fulfil in an optimal manner the objectives of the standard. For the harmonic HM1 of order 1, the lower the amplitude, the fewer constraints there will be on the bus capacitor $C_{bus}$. If the amplitude of the harmonic HM1 of order 1 is low, it will be all the better to increase the amplitude of the harmonic HM2 of order 2, while remaining within the limits defined hereinabove.

Advantageously, upon the injection of two harmonics HM1, HM2, they must initially (at t=0) be substantially in phase opposition (phase-shifted by 180°). In the tables represented hereinbelow, the phases of the harmonics are expressed at 90° with respect to the fundamental of the current.

Figure 3:
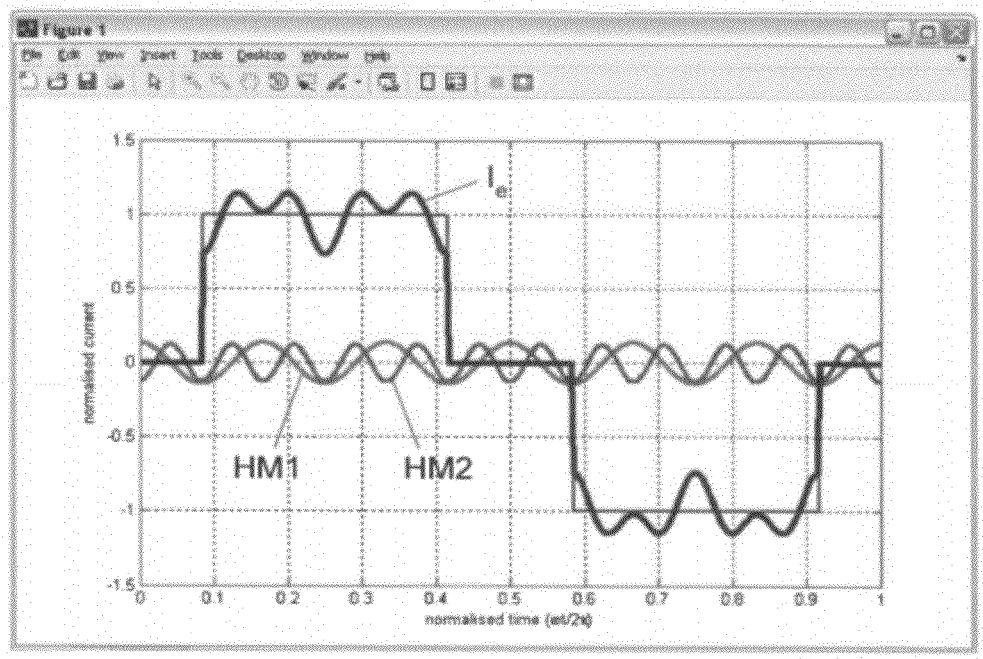
FIGS. 3 to 7 show results obtained for the input current according to various examples described.
Figure 4:
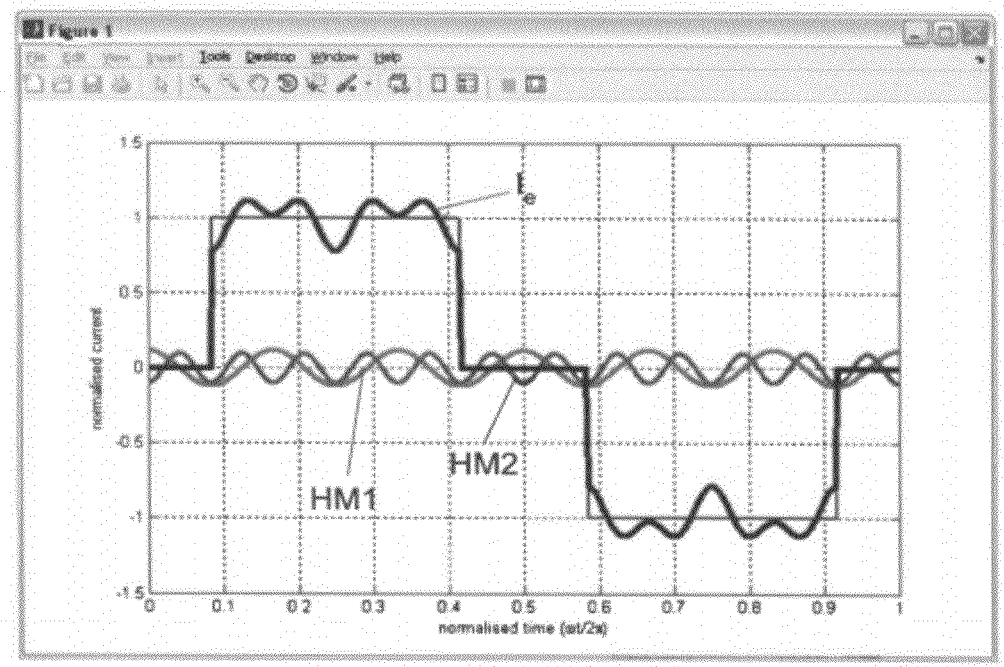

Hereinbelow are two examples of injection of two harmonics HM1, HM2 at respectively 300 Hz and 600 Hz which make it possible to fulfil the objectives set by the standard. For each of these two examples, the results obtained for the input current $I_e$ may be seen respectively in FIG. 3 and in FIG. 4.

Example 1

|  | Amplitude | Phase (degree) | THDi | PWHD | H5 | H7 | H11 | H13 |
|---|---|---|---|---|---|---|---|---|
| HM1 300 Hz | 14% | 0 | 32% | 38% | 27% | 7.4% | 13.4% | 0.5% |
| HM2 600 Hz | 12.5% | 180 | | | | | | |

Example 2

|  | Amplitude | Phase (degree) | THDi | PWHD | H5 | H7 | H11 | H13 |
|---|---|---|---|---|---|---|---|---|
| HM1 300 Hz | 11.9% | 0 | 31.1% | 41.4% | 25.9% | 8.5% | 12.3% | 1.3% |
| HM2 600 Hz | 9.8% | 180 | | | | | | |

These first two examples show the relevance of the injection of only two harmonics at 300 Hz and 600 Hz with the aforementioned characteristics. It is noted that the THDi and the PWHD are below the limits prescribed by the standard, while retaining a sufficient margin.

Figure 5:
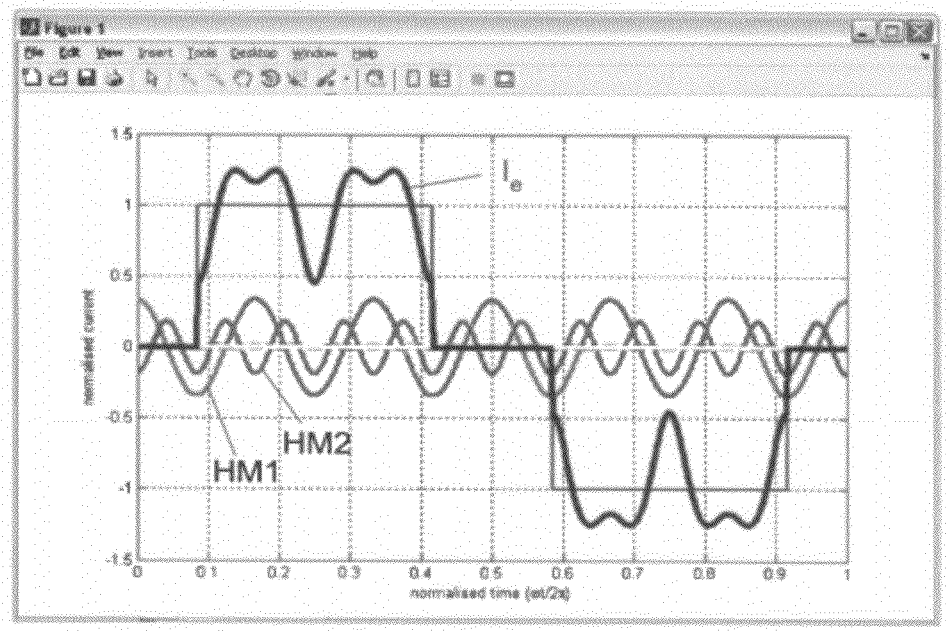

Moreover, the objectives may be fulfilled with the injection of five harmonics but this may turn out to be too constraining, especially at the level of the dynamics of the control. Example 3 hereinbelow makes it possible to illustrate this phenomenon (FIG. 5).

Example 3

|  | Amplitude | Phase (degree) | THDi | PWHD | H5 | H7 | H11 | H13 |
|---|---|---|---|---|---|---|---|---|
| HM1 (300 Hz) | 33.9% | 0 | 39.1% | 20.1% | 36.0% | 2.9% | 13.5% | 5.3% |
| HM2 (600 Hz) | 18.4% | 180 | | | | | | |
| HM3 (900 Hz) | 1.7% | 360 | | | | | | |
| HM4 (1200 Hz) | 0.6% | 180 | | | | | | |
| HM5 (1500 Hz) | 0.0% | 180 | | | | | | |

In example 3 hereinabove, the amplitude of the harmonic of order 1 is too high (about 34%) and gives rise to dimensioning constraints on the bus capacitor.

Figure 6:
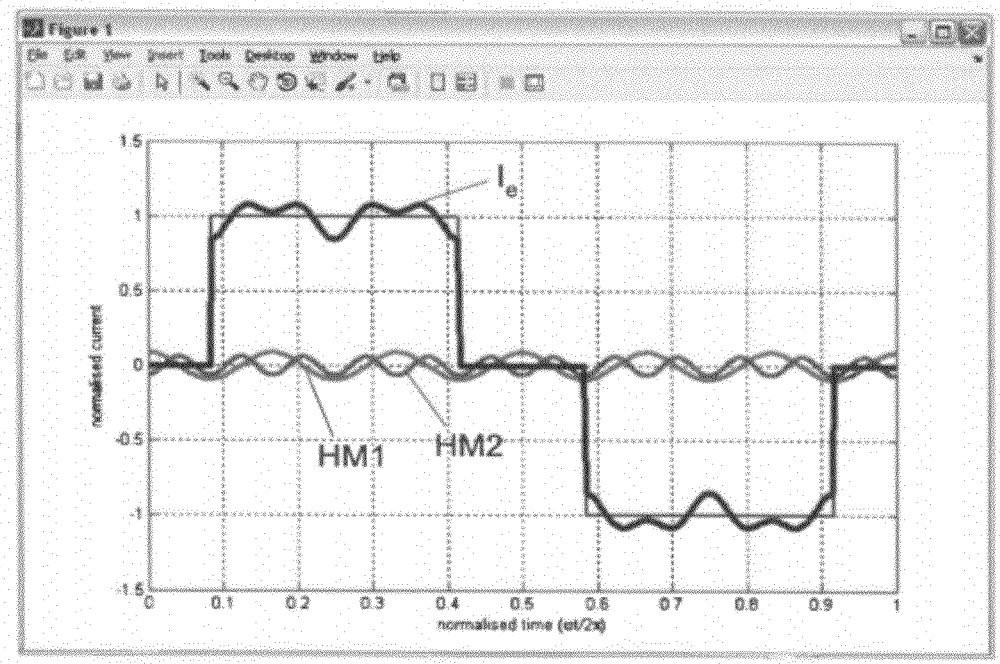
Figure 7:
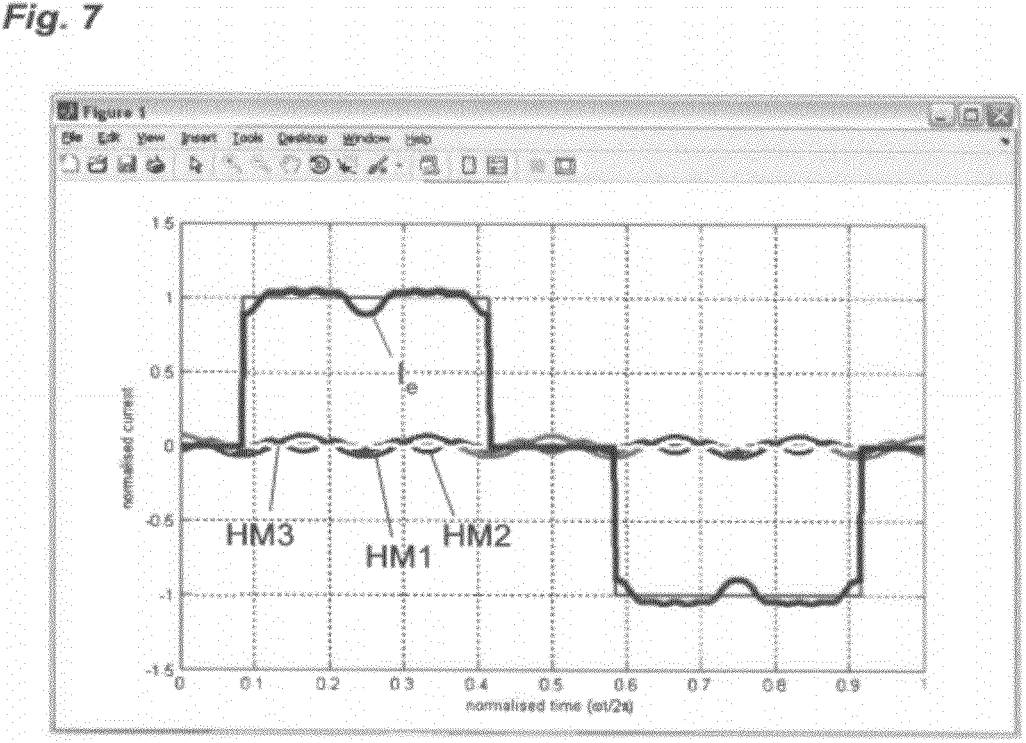

Hereinbelow are two other examples which on the other hand are unsatisfactory. The first example relates to the injection of two harmonics at 300 Hz and 600 Hz and the second example relates to the injection of five harmonics at 300 Hz, 600 Hz, 900 Hz, 1200 Hz, 1500 Hz. For these two other examples, the results obtained for the input current $I_e$ may be seen respectively in FIG. 6 and in FIG. 7. In FIG. 7, the harmonics HM4 and HM5 are not referenced since they are difficult to identify.

Example 4

|  | Amplitude | Phase (degree) | THDi | PWHD | H5 | H7 | H11 | H13 |
|---|---|---|---|---|---|---|---|---|
| HM1 300 Hz | 9.1% | 0 | 30.3% | 46.0% | 24.5% | 9.7% | 11.0% | 3.4% |
| HM2 600 Hz | 6.3% | 180 | | | | | | |

It is noted in this example 4 that the PWHD obtained is not good since it is just equal to the required limit (46%). With respect to examples 1 and 2, it is especially possible to note that the amplitude of the harmonic of order 1 is not greater than 10%, which is without doubt insufficient.

Example 5

|  | Amplitude | Phase (degree) | THDi | PWHD | H5 | H7 | H11 | H13 |
|---|---|---|---|---|---|---|---|---|
| HM1 (300 Hz) | 7.1% | 0 | 30.0% | 48.9% | 23.7% | 10.5% | 10.2% | 4.9% |
| HM2 (600 Hz) | 3.7% | 180 | | | | | | |
| HM3 (900 Hz) | 1.1% | 0 | | | | | | |
| HM4 (1200 Hz) | 0.1% | 360 | | | | | | |
| HM5 (1500 Hz) | 0.8% | 180 | | | | | | |

In this last example, it is noted that, by optimizing to the maximum the THDi, the injection of five synchronized harmonics at six times the frequency of the network does not make it possible to satisfy the criterion of 46% set by the standard for the PWHD.

It is of course possible, without departing from the scope of the invention, to contemplate other variants and refinements of detail and even to envisage employing equivalent means.

The invention claimed is:

1. A power converter comprising:
a rectifier stage connected to plural phases of a network delivering an input current at a determined fundamental frequency and to which a rectifier voltage is applied;
a DC power supply bus connected to the rectifier stage and comprising a first power supply line and a second power supply line to each of which an electric potential is applied to obtain a voltage on the DC power supply bus;
a bus capacitor connected to the first power supply line and to the second power supply line;
a controlled current source situated on the first power supply line or the second power supply line, upstream of the bus capacitor, the controlled current source comprising an inductor and a variable voltage source; and
control means for the controlled current source, which are configured to apply a determined voltage across terminals of the variable voltage source to control a rectifier current, flowing on the DC power supply bus, the voltage being determined on the basis of a rectifier voltage, of the voltage on the DC power supply bus and of current harmonics comprising a first harmonic and a second harmonic synchronized respectively at six times and twelve times the fundamental frequency of the input current delivered by the network, the amplitude and the phase of the first and second harmonics being determined so as to limit the Total Harmonic Distortion of Current (THDi) and the Partial Weighted Harmonic Distortion (PWHD);
wherein the first harmonic exhibits an amplitude lying between 10% and 30% of the rectifier current;

wherein the second harmonic exhibits an amplitude lying between 0 and 15% of the rectifier current; and wherein the first harmonic and the second harmonic are initially injected in phase opposition.

2. A converter according to claim 1, wherein the control means is configured to implement a regulation loop to cause the rectifier current to follow a current reference value equal to a mean reference value onto which the harmonics are injected.

3. A converter according to claim 1, wherein the control means is configured to implement a regulation loop to cause the voltage on the DC power supply bus to follow a reference value containing the harmonics.

4. A converter according to claim 2, wherein the regulation loop is configured to determine reference value for the voltage across the terminals of the variable voltage source.

5. A converter according to claim 1, wherein the variable voltage source comprises an electronic converter comprising a first switching arm, a second switching arm, and a capacitor, which are connected in parallel, each switching arm comprising at least one electronic switch.

6. A variable speed drive comprising:
- an inverter stage including switching arms configured to convert a DC voltage into a variable voltage configured to power an electrical load; and
- a power converter as defined in claim 1, connected upstream of its inverter stage.

* * * * *